M. D. KING.
Improvement in Cultivators.
No. 128,734.  Patented July 9, 1872.
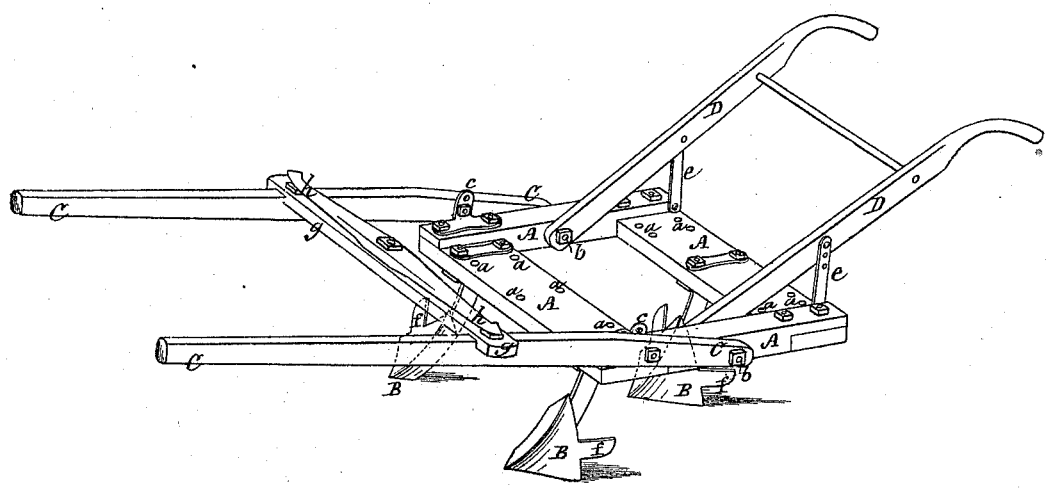

UNITED STATES PATENT OFFICE.

MARQUIS D. KING, OF KING'S FERRY, NEW YORK.

IMPROVEMENT IN CULTIVATORS.

Specification forming part of Letters Patent No. 128,734, dated July 9, 1872.

*To all whom it may concern:*

Be it known that I, MARQUIS D. KING, of King's Ferry, in the county of Cayuga and State of New York, have invented certain new and useful Improvements in a Thill-Cultivator; and I do hereby declare the following to be a full, clear, and exact description of the same, reference being had to the accompanying drawing making a part of this specification, and which represents the cultivator in perspective.

My invention consists in combining, with a quadrilateral-shaped cultivator-frame carrying the hoes or shoes, a pair of thills, and a pair of handles, both pivoted to the sides of said frame centrally, and adjustable vertically thereon by means of arc-pieces and supports on the frame and screw-bolts passing through adjusting-holes therein and through the thills and handles, as will be explained.

To enable those skilled in the art to make and use my invention, I will proceed to describe the same with reference to the drawing.

A represents a quadrilateral-shaped frame, in the cross-pieces of which are set the cultivator-teeth or shoes B and in which said teeth or shoes may be adjusted laterally by means of the screw-bolt holes *a a* therein. At or about the centers, fore and aft, of the side pieces of the frame, as at *b*, the thills C are pivoted; and forward of these pivotal points are arranged on the frame two metallic arc-pieces, *c*, furnished with a series of holes made concentric with pivotal points of the thills, so that said thills may be raised or lowered, and held at the desired height by screw-bolts, pins, keys, or other known fastening devices passing through the thills and through said arc-pieces. The handles D are united to the frame A by the same bolts that pivot the thills C thereto, and said handles may be adjusted vertically by their braces *e e*, which are furnished with adjusting-holes for that purpose, so that the frame may be parallel with the ground and the thills and handles be adjustable up and down at pleasure. The thills are braced in the usual way by the brace-bar *g*, and the whiffletree *h* is attached to said cross-bar or brace. The plows or hoes B may be furnished with wings *f*.

Having thus fully described my invention, what I claim therein as new, and desire to secure by Letters Patent, is—

In combination with the quadrilateral frame A carrying the cultivator hoes, teeth, or plows B, a pair of thills, C, and a pair of handles, D, both pivoted centrally to said frame, as at *b*, and adjustable thereon, respectively, by the arc-pieces *c* and supports *e*, substantially as described and represented.

MARQUIS D. KING.

Witnesses:
JOHN NOBLE,
PHILO CLARK.